United States Patent [19]

Misra et al.

[11] Patent Number: 5,348,725

[45] Date of Patent: Sep. 20, 1994

[54] METHOD OF MAKING PILLARED HYDROTALCITES AND ASSOCIATED PRODUCTS

[75] Inventors: Chanakya Misra, Pittsburgh; Anthony J. Perrotta, Monroeville, both of Pa.

[73] Assignee: Aluminum Company of America, Pittsburgh, Pa.

[21] Appl. No.: 754,770

[22] Filed: Sep. 4, 1991

Related U.S. Application Data

[62] Division of Ser. No. 496,444, Mar. 20, 1990, Pat. No. 5,075,089.

[51] Int. Cl.$^5$ .................... C01B 33/26; C01F 7/04
[52] U.S. Cl. .................... 423/594; 423/326; 423/331; 423/593; 423/595; 423/600; 423/711; 423/718; 502/63; 502/80
[58] Field of Search .............. 423/277, 328, 331, 326, 423/327, 593, 594, 595, 600; 502/62, 80, 84, 63

[56] References Cited

U.S. PATENT DOCUMENTS

| | | | |
|---|---|---|---|
| 3,796,792 | 3/1974 | Miyata et al. | 423/250 |
| 3,879,523 | 4/1975 | Miyata et al. | 423/277 |
| 3,879,525 | 4/1975 | Miyata et al. | 423/277 |
| 4,454,244 | 6/1984 | Woltermann | 502/202 |
| 4,458,026 | 7/1984 | Reichle | 502/80 |
| 4,515,901 | 5/1985 | Elattar | 502/63 |
| 4,665,045 | 5/1987 | Pinnavaia et al. | 502/84 |
| 4,774,212 | 9/1988 | Drezdon | 502/62 |
| 4,835,132 | 5/1989 | Sambrook | 502/303 |
| 4,843,168 | 6/1989 | Drezdzon et al. | 558/357 |
| 4,904,457 | 2/1990 | Misra | 423/115 |
| 5,075,089 | 12/1991 | Misra et al. | 502/63 |

OTHER PUBLICATIONS

Cavalcanti et al., "Interlayer Accessibility In Layered Double-Metal Hydroxides", 31 *Prep. of Catal.* 4, 165–174 (1987).
Drezdzon, "Synthesis of Isopolymetalate-Pillared Hydrotalcite Via Organic-Anion-Pillared Precursors", 27 *Inorganic Chem.*, pp. 4628–4632 (1988).
Kwon et al., "Pillaring Of Layered Double Hydroxides (LDH's) By Polyoxometalate Anions", 110 *J. Am. Chem. Soc.*, pp. 3653–3654 (1988).
Miyata et al., "Adsorption Of $N_2$, $O_2$, $CO_2$ and $H_2$ On Hydrotalcite-Like System" vol. 26, No. 6 *Clays And Clay Minerals*, pp. 441–447 (1978).
Miyata, "Physico-Chemical Properties Of Synthetic Hydrotalcites In Relation To Composition", vol. 28, No. 1 *Clays And Clay Minerals*, pp. 50–56 (1980).
Chibwe et al., "Intercalation Of Organic And Inorganic Anions Into Layered Double Hydroxides", *J. Chem. Soc., Chem. Commun.*, No. 14, pp. 926–927 (Jul., 1989).
Chibwe et al., "Synthesis Of Polyoxometalate-Pillared Layered Double Hydroxides Via Calcined Precursors", vol. 1, No. 5, *Chemistry Of Materials*, pp. 489–490 (Sep.-/Oct. 1989).

*Primary Examiner*—Anthony McFarlane
*Attorney, Agent, or Firm*—David V. Radack; Gary P. Topolosky

[57] ABSTRACT

A method of making a pillared hydrotalcite and an associated products. The pillared hydrotalcite is made by calcining a hydrotalcite having the formula $A_wB_x(OH)_y[C]_z \cdot nH_2O$, wherein A represents a divalent metal cation, B represents a trivalent metal cation, C represents a mono- to tetravalent anion and w, x, y, z and n satisfy the following:

$$0 < z \leq x \leq 4 \leq w \leq \tfrac{1}{2}y \text{ and } 12 \geq n \geq \tfrac{1}{2}(w-x).$$

The method further comprises combining the calcined compound with a salt solution of an anion to make the pillared derivative of the compound and then separating the pillared derivative from the salt solution. A method of intercalating inorganic anions and resulting product is also disclosed.

21 Claims, 1 Drawing Sheet

METHOD OF MAKING PILLARED HYDROTALCITES AND ASSOCIATED PRODUCTS

This is a division, of application Ser. No. 07/496,444, filed Mar. 20, 1990, now U.S. Pat. No. 5,075,089.

BACKGROUND OF THE INVENTION

1. Field Of The Invention

This invention relates to a method of making pillared hydrotalcites and associated products, and more particularly it relates to making pillared hydrotalcites by calcining a hydrotalcite compound and combining the calcined compound with a salt solution of an anion and the resultant products.

2. Background Information

Hydrotalcites are layered double hydroxide compounds of the type

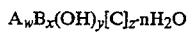

$$A_wB_x(OH)_y[C]_z \cdot nH_2O$$

where A represents a divalent metal cation, B represents a trivalent metal cation and C represents a mono- to tetravalent anion. The structure of these compounds consists of brucite-like layers of the metal hydroxide between which the anions are sandwiched. One example of a hydrotalcite compound is

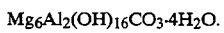

$$Mg_6Al_2(OH)_{16}CO_3 \cdot 4H_2O.$$

Some hydrotalcites are found naturally but may also be synthesized for commercial use. One method used for synthesis is by combining activated magnesia and aluminate liquors. See U.S. Pat. No. 4,904,457, the disclosure of which is fully incorporated by reference herein.

The "pillaring" of certain metal hydroxide compounds is known. Pillaring has been used extensively with respect to cation replacement in smectite clays. Hydrotalcite pillaring involves modifying the brucite-like molecular layers of the hydrotalcite with an organic, inorganic or mixed organic/inorganic anion. Pillared hydrotalcites are useful as adsorbents, catalysts and molecular sieves.

U.S. Pat. No. 4,774,212 describes several pillared hydrotalcite structure compositions wherein the pillared anion can be (i) an organic anion selected from the group consisting of lauryl sulfate, p-toluenesulfonate and 1,5-naphthalene disulfonate; (ii) an inorganic anionic polyoxometalate selected from the group consisting of polyoxometalates of vanadium, tungsten and molybdenum; or (iii) a mixed organic/inorganic anion.

U.S. Pat. No. 4,774,212 also discloses a process for making pillared compositions comprising contacting a hydrotalcite structure composition having a large organic anion selected from the group consisting of p-toluenesulfonate, terephthalate, 2,5-dihydroxy-1,4-benzenedisulfonate and 1,5-naphthalenedisulfonate with a solution containing polyoxometalates of vanadium, tungsten and molybdenum at a pH of between about 3 and 6 and temperature between about 20° C. and 100° C. In this process it is said that at least some of the large organic anions are substituted by the anion of the polyoxometalate. This patent further discloses heating a pillared composition of the hydrotalcite structure which contains both large organic and inorganic anions until substantially all the large organic anion has been removed therefrom.

The pillaring process disclosed in U.S. Pat. No. 4,774,212 involves replacing the carbonate anion from the hydrotalcite first with an organic anion and then with an inorganic anion. As will be appreciated, this process involves multiple steps using different organic and inorganic anions.

There remains a need for a more efficient and commercially viable means for producing pillared hydrotalcite which involves less process steps while maintaining the usefulness and integrity of the final product.

SUMMARY OF THE INVENTION

The present invention meets the above need. The method of this invention involves making a pillared derivative of a compound having the formula $A_wB_x(OH)_y[C]_z \cdot nH_2O$, wherein A represents a divalent metal cation, B represents a trivalent metal cation, C represents a mono- to tetravalent anion and w, x, y, z and n satisfy the following relationships:

$$0 < z \leq x \leq 4 \leq w \leq \tfrac{1}{2}y \text{ and } 12 \geq n \geq \tfrac{1}{2}(w-x).$$

The method includes calcining the aforementioned compound, combining the calcined compound with a salt solution of an anion to make the pillared derivative containing the anion and separating the pillared derivative from the solution.

Alternate embodiments of this method further include intercalating anions into a compound having the formula $A_6B_2(OH)_{16}[C]_z \cdot 4H_2O$ wherein A is selected from the group consisting of $Mg^{2+}$, $Ni^{2+}$, $Fe^{2+}$ and $Zn^{2+}$; B is selected from the group consisting of $Al^{3+}$, $Fe^{3+}$ and $Cr^{3+}$; and C is selected from the group consisting of $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$; and $\tfrac{1}{2} \leq z \leq 2$. The method comprises heating the compound to one or more temperatures within a range of about 400°–800° C., (752° F.–1472° F.), combining this heated (or calcined) compound with an anion salt solution to form a pillared hydrotalcite, then separating the pillared hydrotalcite from the solution.

On a more preferred basis, this method includes intercalating one or more inorganic anions selected from the group consisting of $Cr_2O_7^{2-}$, $Mo_7O_{24}^{6-}$, $SiO_3^{2-}$, $VO_3^-$ and $WO_4^{2-}$ between the cationic layers of a hydrotalcite-like compound to produce a pillared derivative having an X-ray diffraction [d(001)] value of between about seven and twelve Angstroms (7 Å and 12 Å) for the distance between the brucite-like layers. The method includes providing the hydrotalcite-like compound in an activated calcined form, combining the activated calcined compound with a salt solution of at least one of the aforementioned inorganic anions to produce the pillared derivative and separating the pillared derivative from the salt solution. The invention also includes pillared hydrotalcite derivatives produced by the above methods.

It is an objective of this invention to produce a pillared hydrotalcite by a calcination-reformation method.

It is a further objective of this invention to produce a pillared hydrotalcite wherein the pillars are organic, inorganic or mixed organic/inorganic anions.

It is a further objective of this invention to increase the spacing between the brucite-like layers of the hydrotalcite.

It is still a further objective of this invention to produce pillared hydrotalcites having a distance between the brucite-like layers of between about seven and twelve Angstroms (7 Å and 12 Å).

These and other objects of the invention will be fully understood from the following description of the invention with reference to the drawings appended to this application.

DESCRIPTION OF THE PREFERRED EMBODIMENT

Figure 1:
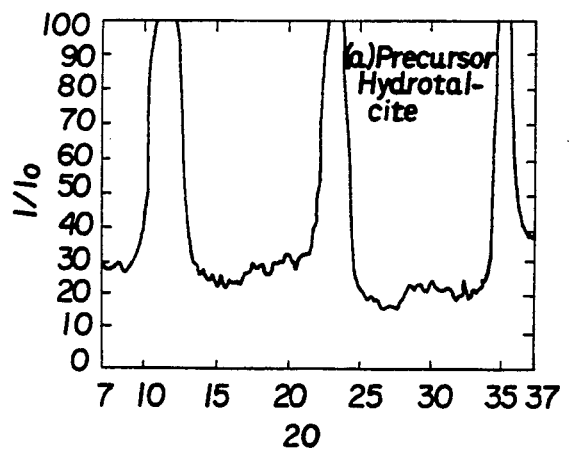
FIG. 1 is an X-ray diffractogram of the precursor hydrotalcite described in the Example.

As is known, hydrotalcite may be synthesized from aluminate liquors of varying composition and activated magnesia obtained by calcination of hydroxide or hydroxycarbonate precursors. One form of synthetic hydrotalcites has a structure comprising brucite-like octahedral layers having a chemical formula of the type $A_wB_x(OH)_y[C]_z \cdot nH_2O$ wherein A represents a divalent metal cation, B represents a trivalent metal cation, C represents a mono- to tetravalent anion and w, x, y, z and n satisfy the following relationships:

$$0 < z \leq x \leq 4 \leq w \leq \tfrac{1}{2}y \text{ and } 12 \geq n \geq \tfrac{1}{2}(w-x).$$

Certain hydrotalcites can have the formula $A_6B_2(OH)_{16}[C]_z \cdot 4H_2O$ where A can be selected from the group consisting of $Mg^{2+}$, $Ni^{2+}$, $Fe^{2+}$ and $Zn^{2+}$; B is selected from the group consisting of $Al^{3+}$, $Fe^{3+}$ and $Cr^{3+}$; C is selected from the group consisting of $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$; and $\tfrac{1}{2} \leq z \leq 2$. One preferred embodiment hydrotalcite consists of

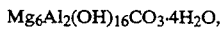

Mg$_6$Al$_2$(OH)$_{16}$CO$_3$·4H$_2$O, which may also be written as

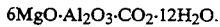

6MgO·Al$_2$O$_3$·CO$_2$·12H$_2$O.

Some individuals refer to any compound which satisfies the foregoing formulae as a "hydrotalcite". Others, however, divide this family of compounds into various subgroups depending upon the divalent and trivalent cations which comprise every other layer. For example, pyroaurites have the basic formula Mg$_6$Fe$_2$OH$_{16}$CO$_3$·4H$_2$O. (These compounds have also been referred to as "sjogrenites"). Takovites, on the other hand, consist essentially of a compound having the formula Ni$_6$Al$_2$OH$_{16}$CO$_3$·4H$_2$O.

The main structural unit for hydrotalcite consists essentially of sheets of brucite, a magnesium hydroxide, Mg(OH)$_2$. By substituting a trivalent aluminum cation for some fraction of the magnesium ions in these sheets, layers of magnesium and aluminum components are created which still maintain the desired structure. To compensate for any resulting charge imbalances, additional anions (as designated by the letter C in the preceding formulae) are intercalated between Mg-Al layers and into this structure. Through the formation of hydrogen bonds, these anions and water molecules form interlayers of (C·nH$_2$O) between the brucite-like sheets. The anion with the greatest affinity for combining with brucite to form hydrotalcite is carbonate $(CO_3)^{2-}$.

Hydrotalcite, itself, exists as both a natural and synthetic compound. Naturally occurring deposits of this mineral have been found in Snarum, Norway and in the Ural Mountains. Typical occurrences are in the form of serpentines, talc schists, or as an alteration product of spinel where, in some cases, hydrotalcite forms as a pseudomorph of the spinel. Like most ores and compounds, natural hydrotalcite is virtually impossible to find in a totally pure state. Natural deposits typically contain one or more other minerals including, but not limited to, penninite and muscovite, or combinations of several undesirable heavy metal ions. Conventional practices recognize that it is virtually impossible to remove all such incidental elements and impurities from this product. In any event, known deposits of natural hydrotalcite remain very limited.

One method of this invention comprises the steps of calcining a hydrotalcite compound to create a calcined compound, combining this calcined compound with a salt solution of the preferred anion to make the pillared derivative containing said anion and separating this pillared derivative from the salt solution.

In order to "pillar" hydrotalcite according to the invention, the hydrotalcite compound should be calcined to one or more of the temperatures between about 400°–800° C. (752°–1472° F.), or between about 450°–550° C. (846°–1022° F.) on a preferred basis. Such calcining may be performed by placing the hydrotalcite in a vessel and heating it at the above temperatures for at least 20 minutes. More preferably this compound is heated for four (4) hours. It is possible to "over-calcine" hydrotalcite rendering it virtually inactive. The hydrotalcite should be provided in an activated calcined form. Such calcining removes CO$_2$ from the brucite-like structure to create a defect hydrotalcite structure which is subsequently recrystallized with anionic pillars.

After calcining, this calcined compound is combined with a salt solution of an anion to make an anion-containing pillared derivative. The salt solution can be either organic or inorganic. Examples of organic anion salt solutions are carboxylic acid anions, dicarboxylic anions, dodecylsulfate and long chain fatty acid an ions. On a preferred basis inorganic anion salt solutions for this invention can be selected from the group consisting of $Cr_2O_7^{2-}$, $Mo_7O_{24}^{6-}$, $SiO_3^{2-}$, $VO_3^-$ and $WO_4^{2-}$. These salts can be Na$_2$Cr$_2$O$_7$·2H$_2$O; [NH$_4$]$_6$Mo$_7$O$_{24}$·4H$_2$O; Na$_2$SiO$_3$·9H$_2$O; NaVO$_3$; and Na$_2$WO$_4$·2H$_2$O.

Calcined hydrotalcite compound may be combined with the salt solution of the anion by placing both constituents in a reaction vessel equipped with an anchor-type agitator and agitating the mixture to create the pillared hydrotalcite. The agitation step can be carried out at temperatures from about room temperature to about 250° C. (482° F.), preferably at about 60° C. (140° F.) for about 20 minutes to about 28 hours with about 8 hours being more preferred.

The pillared hydrotalcite can then be separated from the salt solution, rinsed and dried. The separation step involves filtering or centrifugation at room temperature. The rinsing step involves washing the resulting hydrotalcite cake several times using deionized water at room temperature until the hydrotalcite cake is free of anionic solution. One means of drying involves placing the hydrotalcite cake into a drying oven maintained at about 105° C. (221° F.) for about eight hours though it is to be understood that still other separation, rinsing and drying steps may be employed with this invention.

It will be appreciated that the extent of pillaring into a calcined hydrotalcite compound will depend, in part, upon the aluminum to magnesium ratio in the composition of the precursor hydrotalcite. By varying the aluminum content in the precursor, the characteristics of the pillared hydrotalcite will change in so much as the aluminum substitution determines the amount of positive charge in the octahedral brucite layers.

EXAMPLE

An experimental synthetic hydrotalcite having the formula

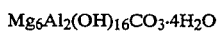

$Mg_6Al_2(OH)_{16}CO_3 \cdot 4H_2O$ was produced by calcining technical grade magnesium hydroxide [$Mg(OH)_2$] and magnesium hydroxy carbonate [$Mg_5(CO_3)_4(OH)_2 \cdot 4H_2O$]. This intermediate was then combined with certain aluminate liquors which were prepared by dissolving Alcoa brand C-30 aluminum hydroxide in a sodium hydroxide solution at 150° C. (302° F.). Sodium carbonate was added for total caustic to total alkali (TC/TA) control such that TC is sodium hydroxide caustic expressed as sodium carbonate and TA is sum of total alkali which includes both the sodium hydroxide and sodium carbonate, also expressed as sodium carbonate. For experimental purposes, synthesis was carried out in sealed high density polyethylene bottles rotating end over end in a water bath maintained at about 90° C. (194° F.). Run time was four hours using 10 g of equivalent magnesia and 250 ml of liquor in each case. At the end of the run, the product was filtered, washed with distilled water and dried overnight at about 105° C. (221° F.).

Several samples were made from the resulting product. One sample was then calcined (or activated) by heating at about 500° C. (932° F.) for about four hours. This product was analyzed for chemical composition and XRD identification (distance between the brucite layers) before thermal activation, and for surface area (m²/g) and pore diameter (Å) after thermal activation. This calcined or activated product was further divided into three separate samples designated "A", "B" and "C". Anion replacement was carried out by separately agitating about 25 grams of (i) sample "A" with about 2500 ml of 1N $Na_2Cr_2O_7 \cdot 2H_2O$ solution; (ii) sample "B" with about 2500 ml of 1N $(NH_4)_6Mg_7O_{24} \cdot 4H_2O$ solution; and (iii) sample "C" with about 2500 ml of 1N $Na_2SiO_3 \cdot 9H_2O$ solution. Agitation was continued for 24 hours or more in a $N_2$ atmosphere at room temperature using a 5 liter stainless steel reaction vessel equipped with an anchor-type agitator. The material was removed at the end of each reaction period, filtered, displacement washed with hot distilled water and dried at 105° C. (221° F.) The samples were analyzed for chemical composition, XRD identification (distance between brucite layers) surface area (m²/g) and pore diameter (Å).

The following table shows data for normal hydrotalcite, the above precursor hydrotalcite and the different pillared materials ( "A", "B" and "C") made by the calcination-reformation method of this invention.

| Name | Pillaring Anion (X) | Chemical Composition | | | Distance Between Brucite Layers Å | After Activation at 500° C. for 4 hours | |
|---|---|---|---|---|---|---|---|
| | | % Mg | % Al | % (X) | | Surface Area m²/g | Pore Diameter Å |
| 1. Normal Hydrotalcite + ($Mg_6Al_2(OH)_{16}CO_3 \cdot 4H_2O$) | None | 21.5 | 10.0 | — | 7.69 | — | — |
| 2. Precursor Hydrotalcite (Sample 21) | None | 22.1 | 11.7 | — | 7.695 | 162 | 73 |
| 3. Pillared Hydrotalcite "A" | $Cr_2O_7^{2-}$ | 17.9 | 12.1 | 8.1 (Cr) | 8.4 | 18 | 92 |
| 4. Pillared Hydrotalcite "B" | $Mo_7O_{24}^{6-}$ | 13.8 | 8.2 | 23.4 (Mo) | 9.6–10.4 | 34 | 225 |
| 5. Pillared Hydrotalcite "C" | $SiO_3^{2-}$ | 25.1 | 10.3 | 6.2 (Si) | 7.7 | 111 | 56 |

By way of this invention, the distance between brucite-like layers of the hydrotalcite compound before and after pillaring was expanded from 7.69 Å to 8.4 Å when intercalated with $Cr_2O_7^{2-}$ ions. The intercalation of $Mo_7O_{24}^{6-}$ ions increased the layer separation to about 9.6 Å. In the case of silication, although 6.2% Si was found chemically, the interlayer spacing (7.7 Å) is essentially the same as the starting hydrotalcite (7.695 Å). In all three intercalated compounds, brucite layer spacing was well below about 12 Å while the (220) reflection was essentially unaffected at about 1.53 Å. It is believed that this is due to d-spacing being affected principally by the Mg/Al ratio in the octahedral brucite layers and not by the size of the pillaring anion.

Figure 2:
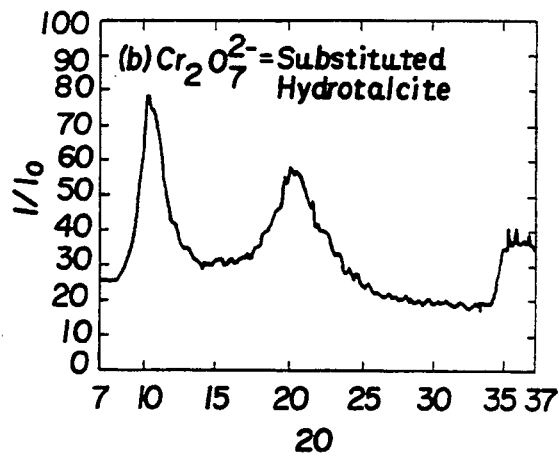
FIG. 2 is an X-ray diffractogram of a pillared hydrotalcite produced by the method of the invention wherein the anion pillar is $Cr_2O_7^{2-}$.

FIGS. 1–4 show the X-ray diffractograms of some of the pillared hydrotalcites in the table. FIG. 1 shows the X-ray diffractogram of the precursor hydrotalcite. Referring now to FIG. 1, the vertical axis gives the intensity of the diffraction line and the horizontal axis gives the 2 Θ value which is converted to the d-spacings shown in the earlier presented table. FIG. 2 shows the X-ray diffractogram of the pillared hydrotalcite where the anion pillar is $Cr_2O_7^{2-}$. It is important to note that the [d(001)] peak is at 11° which corresponds to the d-spacing value given in the preceding table.

Figure 3:
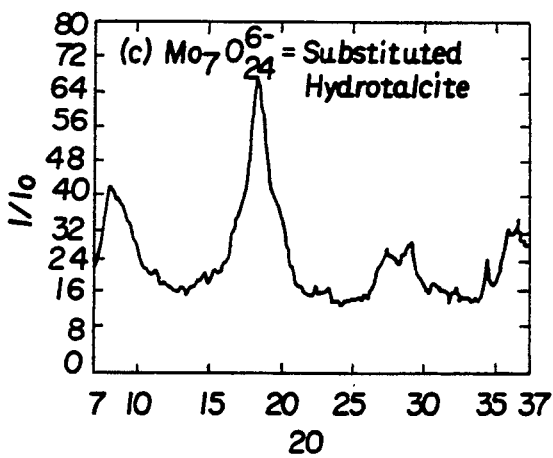
FIG. 3 is an X-ray diffractogram of a pillared hydrotalcite produced by the method of the invention wherein the anion pillar is $Mo_7O_{24}^{6-}$.

FIG. 3 shows the X-ray diffractogram of the pillared hydrotalcite where the anion pillar is $Mo_7O_{24}^{6-}$. The [d(001)] peak is at 8° thus corresponding to the d-spacing value given in the preceding table.

Figure 4:
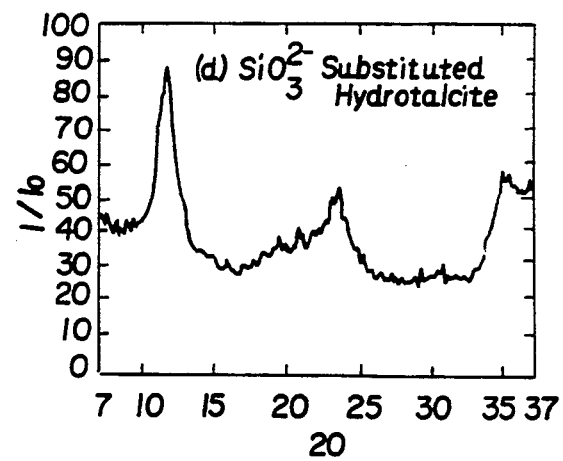
FIG. 4 is an X-ray diffractogram of a pillared hydrotalcite produced by the method of the invention wherein the anion pillar is $SiO_3^{2-}$.

Finally, FIG. 4 shows the X-ray diffractogram of the pillared hydrotalcite where the anion pillar is $SiO_3^{2-}$ and the [d(001)] peak is at 13°.

It will be appreciated that a method of making a pillared hydrotalcite by a calcination-reformation process has been shown. The products resulting from this method are pillared hydrotalcites having one or more organic, inorganic or mixed organic/inorganic anions pillared therein. The method of this invention is efficient and can be used to produce pillared products on a large commercial scale.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. A method of making a pillared derivative of a compound having the formula $A_wB_x(OH)_y[C]_z \cdot nH_2O$, wherein A represents a divalent metal cation, B represents a trivalent metal cation, C represents a mono- to tetravalent anion, and w, x, y, z and n satisfy the following:

$$0 < z \leq x \leq 4 \leq w \leq \tfrac{1}{2}y \text{ and } 12 \geq n \geq \tfrac{1}{2}(w-x).$$

said method comprising:
(a) calcining the compound;
(b) combining said calcined compound with a salt solution of an anion to make a pillared derivative of said compound; and
(c) separating said pillared derivative from said salt solution.

2. The method of claim 1, wherein employing as said compound one having the formula:

$$A_6B_2(OH)_{16}[C]_z \cdot 4H_2O$$

where $\tfrac{1}{2} \leq z \leq 2$.

3. The method of claim 2, wherein employing: A selected from the group consisting of $Mg^{2+}$, $Ni^{2+}$, $Fe^{2+}$ and $Zn^{2+}$; B selected from the group consisting of $Al^{3+}$, $Fe^{3+}$ and $Cr^{3+}$; and C selected from the group consisting of $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$.

4. The method of claim 1, wherein employing as said compound one selected from the group consisting of natural hydrotalcite, synthetic hydrotalcite, pyroaurite and takovite.

5. The method of claim 1, wherein recitation (a) includes:
heating said compound to one or more temperatures within about 400°–800° C. (752°–1472° F.) for at least about 20 minutes.

6. The method of claim 5, wherein
heating said compound to one or more temperatures within about 450°–550° C. (842°–1022° F.).

7. The method of claim 5, wherein recitation (b) includes:
(i) agitating said calcined compound and said anion salt solution for at least about 20 minutes; and
(ii) forming said pillared derivative at one or more temperatures above about 20° C. (68° F.).

8. The method of claim 1, which further includes:
(d) rinsing the separated derivative; and
(e) drying said rinsed derivative.

9. The method of claim 8, wherein recitation (d) includes rinsing the pillared hydrotalcite with distilled water having a temperature between about 20° C. to 50° C. (68°–122° F.).

10. The method of claim 1, wherein employing as said salt solution of the anion one selected from the group consisting of $Cr_2O_7^{2-}$, $Mo_7O_{24}^{6-}$, $SiO_3^{2-}$, $VO_3^-$ and $WO_4^{2-}$.

11. The method of claim 1, wherein creating said pillared derivative having brucite layers and having an X-ray diffraction [d(001)] value below about twelve Angstroms (12 Å) for the distance between the brucite layers.

12. A method for intercalating anions into a compound having the formula $A_6B_2(OH)_{16}[C]_z \cdot 4H_2O$ wherein A is selected from the group consisting of $Mg^{2+}$, $Ni^{2+}$, $Fe^{2+}$ and $Zn^{2+}$; B is selected from the group consisting of $Al^{3+}$, $Fe^{3+}$ and $Cr^{3+}$; and C is selected from the group consisting of $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$; and $\tfrac{1}{2} \leq z \leq 2$, said method comprising:
(a) heating the compound to one or more temperatures between about 400°–800° C. (752°–1472° F.) for at least about 20 minutes
(b) combining said heated compound with an anionic salt solution to form a pillared hydrotalcite containing said an ion; and
(c) separating said pillared hydrotalcite from the solution.

13. The method of claim 12, wherein employing as said compound one selected from the group consisting of natural hydrotalcite, synthetic hydrotalcite, pyroaurite and takovite.

14. The method of claim 12, wherein recitation (a) includes heating said compound to one or more temperatures within about 450°–550° C. (842°–1022° F.) for about 4 or more hours.

15. The method of claim 12, wherein employing as said salt solution of said anion one selected from the group consisting of $Cr_2O_7^{2-}$, $Mo_7O_{24}^{6-}$, $SiO_3^{2-}$, $VO_3^-$ and $WO_4^{2-}$.

16. The method of claim 12, which further includes:
(d) rinsing said separated compound with distilled water; and
(e) drying said rinsed compound.

17. The method of claim 12, wherein creating said pillared derivative having brucite layers and having an X-ray diffraction [d(001)] value between about seven and twelve Angstroms (7 Å–12 Å) for the distance between the brucite layers.

18. A method for intercalating one or more inorganic anions selected from the group consisting of $Cr_2O_7^{2-}$, $Mo_7O_{24}^{6-}$, $SiO_3^{2-}$, $VO_3^-$ and $WO_4^{2-}$ into a compound having the structure of a hydrotalcite to produce a pillared derivative of said compound having brucite layers and having an X-ray diffraction [d(001)] value of between about seven to twelve Angstroms (7 Å–12 Å) for the distance between the brucite layers, said method comprising:
(a) providing the compound having the structure of a hydrotalcite in an activated calcined form;
(b) combining said activated calcined compound with a salt solution of said inorganic anion to produce said pillared derivative; and
(c) separating said pillared derivative from said salt solution.

19. The method of claim 18, wherein employing $Cr_2O_7^{2-}$ as said inorganic anion and creating said pillared derivative having an X-ray diffraction [d(001)] value below about 8.6 Angstroms (8.6 Å) for the distance between the brucite layers.

20. The method of claim 18, wherein employing $Mo_7O_{24}^{6-}$ as the inorganic anion and creating said pillared derivative having an X-ray diffraction [d(001)] value between about 9.4–10.6 Angstroms (9.4 Å–10.6 Å) for the distance between the brucite layers.

21. The method of claim 18, wherein employing $SiO_3^{2-}$ as the inorganic anion and creating said pillared derivative having an X-ray diffraction [d(001)] value below about 8 Angstroms (8 Å) for the distance between the brucite layers.

* * * * *